United States Patent [19]

Spendlove

[11] Patent Number: 5,530,607
[45] Date of Patent: Jun. 25, 1996

[54] WING ATTACHMENT FOR HEAD LOAD/UNLOAD IN A DATA STORAGE DEVICE

[75] Inventor: Jay Spendlove, Ogden, Utah

[73] Assignee: Iomega Corporation, Roy, Utah

[21] Appl. No.: 324,581

[22] Filed: Oct. 18, 1994

[51] Int. Cl.⁶ .............................. G11B 5/54; G11B 21/22
[52] U.S. Cl. ............................................................ 360/105
[58] Field of Search ............................................ 360/105

[56] References Cited

U.S. PATENT DOCUMENTS

| | | | |
|---|---|---|---|
| 4,504,879 | 3/1985 | Toldi et al. | 360/105 |
| 4,663,677 | 5/1987 | Griffith et al. | 360/71 |
| 4,663,682 | 5/1987 | McNeil | 360/105 |
| 4,663,686 | 5/1987 | Freeman et al. | 360/128 |
| 4,683,506 | 7/1987 | Toldi et al. | 360/105 |
| 4,722,012 | 1/1988 | Toldi et al. | 360/97 |
| 4,740,851 | 4/1988 | Jones et al. | 360/97 |
| 4,787,000 | 11/1988 | Schulze | 360/105 |
| 4,811,143 | 3/1989 | Ohashi et al. | 360/105 |
| 4,901,173 | 2/1990 | Jones et al. | 360/99 |
| 4,965,685 | 10/1990 | Thompson et al. | 360/97 |
| 5,027,241 | 6/1991 | Hatch et al. | 360/105 |
| 5,237,477 | 8/1993 | Hodapp et al. | 360/128 |
| 5,267,227 | 11/1993 | Nanke | 369/77.1 |
| 5,309,624 | 5/1994 | Nishikawa | 360/105 |

FOREIGN PATENT DOCUMENTS

WO93/18507  9/1993  WIPO.

OTHER PUBLICATIONS

"An Introduction to the Insite 325 Floptical® Disk Drive" Jim Godwin, SPIE vol. 1078, Presented at SPIE Optical Data Storage Topical Meeting (1989).

*Primary Examiner*—Robert S. Tupper
*Attorney, Agent, or Firm*—Woodcock Washburn Kurtz Mackiewicz & Norris

[57] ABSTRACT

In a magnetic disk drive heads are loaded and unloaded onto the magnetic disk by wings attached in close proximity to the magnetic heads. The wings are cylindrical rods which ride on opposed ramps to separate the heads so that they can travel on either side of the disk and the heads are then brought together properly onto the disk. The wings are attached to the suspension arms of a Winchester head assembly by an attachment device having a tapered notch with an interference fit which secures the rods.

5 Claims, 3 Drawing Sheets

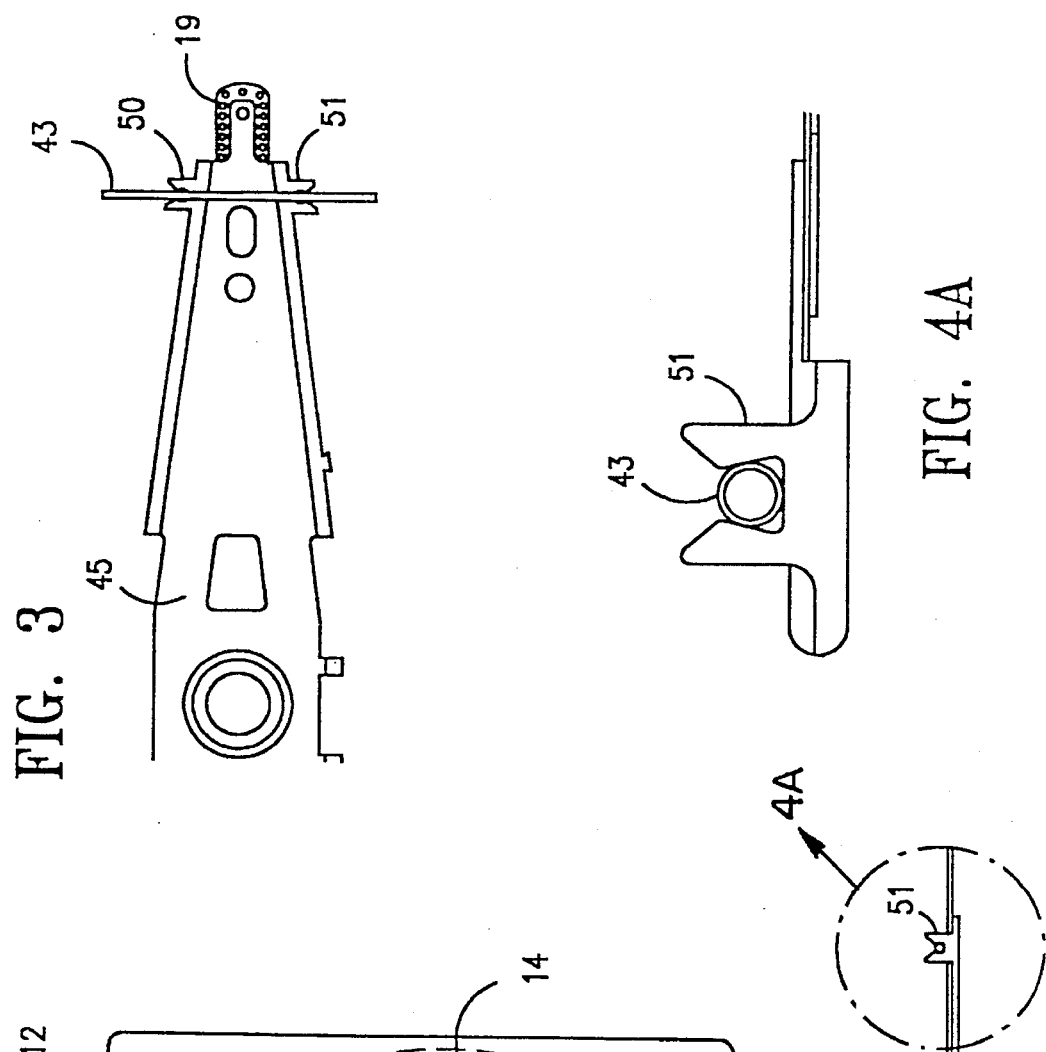
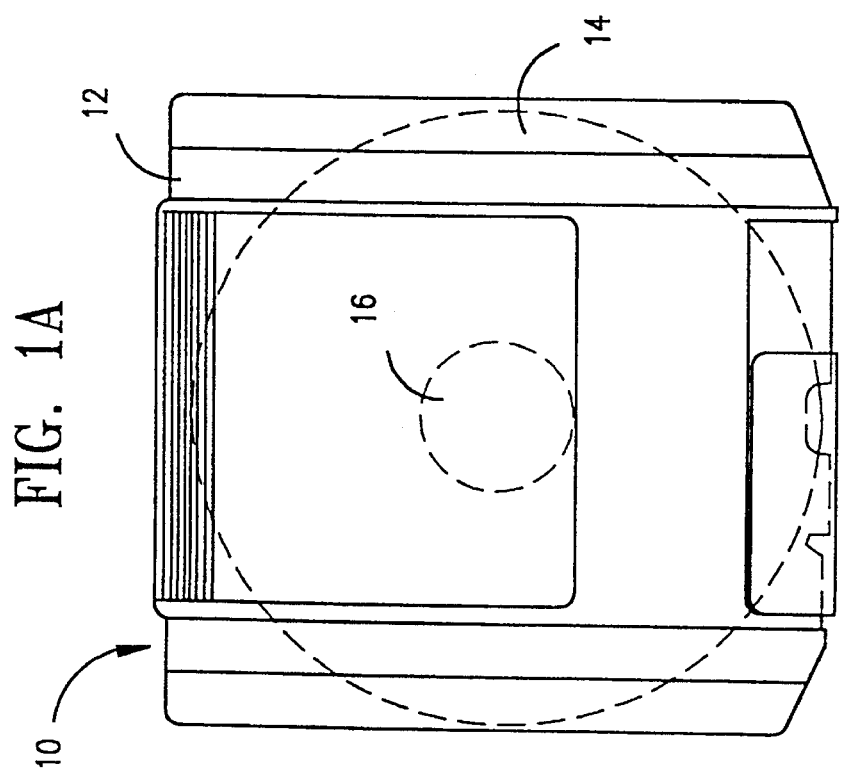

WING ATTACHMENT FOR HEAD LOAD/UNLOAD IN A DATA STORAGE DEVICE

RELATED APPLICATIONS

"Head Load/Unload and Cleaning in a Data Storage Device", Ser. No. 324,895, filed concurrently herewith, is incorporated herein by reference.

BACKGROUND OF THE INVENTION

This invention relates to an actuator for carrying read/write heads into engagement with a recording medium and more particularly, to a wing attachment device for loading, unloading and cleaning of heads.

U.S. Pat. Nos. 4,740,851 - Jones, et al and 4,663,677 - Griffith, et al show removable media magnetic disk drives of the type made by the assignee of the present ivention. A cartridge having a flexible recording medium is inserted into the disk drive. A motor rotates the disk which is engaged by magnetic read/write heads.

Out of plane flexible disk edge stability and flutter, as well as variations due to assembly tolerances, causes difficulty in loading and unloading a pair of opposing heads on to or off of a disk. Loading and unloading generally needs a large amount of vertical displacement of the heads in order to avoid damaging the heads on the edge of the spinning and fluttering disk. Also, reduction in the preload of the heads can occur as the heads are loaded and unloaded at large vertical displacements.

An improved device for loading and unloading the heads and for cleaning the heads is described in the aforementioned copending patent application. This head load/unload system requires the attachment of a wing to the flexible head suspension arms.

It is an object of the present invention to provide an improved attachment device for the wings used for loading and unloading the heads on the magnetic medium and for cleaning the magnetic heads.

SUMMARY OF THE INVENTION

In accordance with the present invention, a cylindrical rod is attached as a wing to the magnetic head suspension in close proximity to the head so that the motion of the head closely tracks the motion of the wing. The wing is attached with a device having a tapered notch with an interference fit to secure the rod. Two attachment devices are provided on either side of the head suspension arms. The rod extends transversely across the head. The notch in each of the attachment devices extends upwardly and the wing is pressed into place in the notch. The wing is locked down to prevent the wing from coming out during operation. The notch is tapered to lock the wing down securely so that it cannot be removed without great force. The wing is constrained in the X, Y and Z axes without using glue or other secondary techniques to assure a secure attachment.

The foregoing and other objects, features and advantages of the invention will be better understood from the following more detailed description and appended claims.

SHORT DESCRIPTION OF THE DRAWINGS

FIG. 1A shows a cartridge of the type used in such a disk drive;

FIG. 3 shows a plan view of the head suspension arm;

FIG. 4 shows a side view of the head suspension arm; and

FIG. 4A shows the wing attachment device of the present invention.

DESCRIPTION OF THE PREFERRED EMBODIMENT

Figure 1:
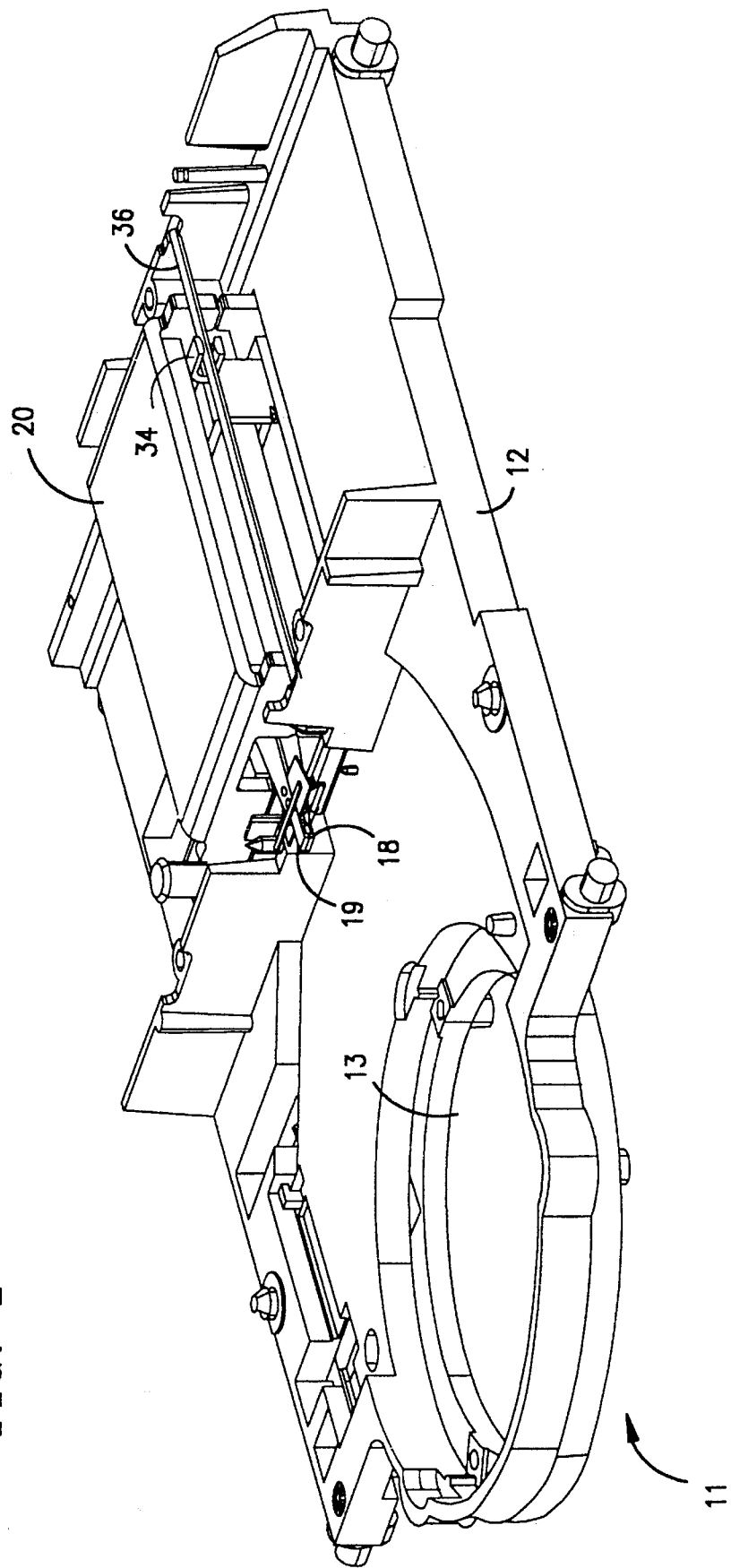
FIG. 1 shows the disk drive of the present invention with the cover removed.

FIG. 1 shows a disk drive of the type in which a cartridge 10 (FIG. 1A) contains a recording media 14. The cartridge is inserted into the drive at 11. A motor is mounted on platform 12 at 13. The motor rotates the flexible disk in the cartridge. The cartridge shown in FIG. 1A has a disk 14 with a hub 16 rotatably mounted therein to be rotated by the motor.

The disk is engaged by opposed read/write heads 18 and 19 which are carried by the actuator. Opposed heads engage both sides of the disk.

Figure 2:
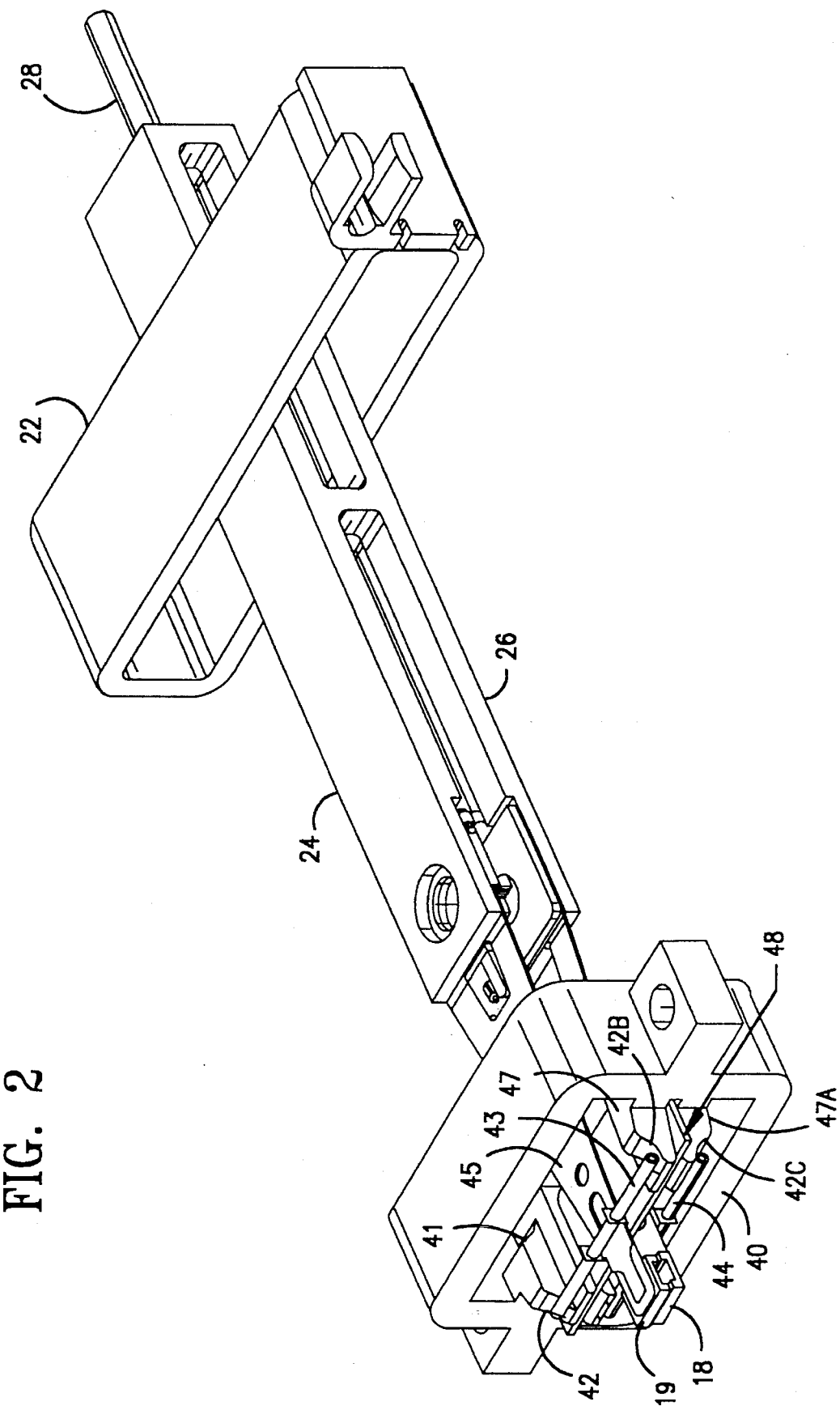
FIG. 2 shows the head loading/unloading mechanism of the related application.

The voice coil motor for driving the carriage into and out of engagement of the heads with the recording medium includes an outer return path member 20. FIG. 2 shows a coil 22 mounted on the carriage assembly. When the coil 22 is energized, it interacts with the magnets to move the carriage linearly so that the heads 18 and 19 engage concentric tracks on the disk. The carriage assembly includes two lightweight arms 24 and 26. The carriage assembly travels on a central guide track 28 which is a cylindrical member, a small wire guide in the preferred embodiment. The carriage assembly has two bushings through which the cylindrical guide track passes.

The head load/unload device 40 is shown in FIG. 2. It includes first opposed ramps (41 is shown) and second opposed ramps (42, 42B and 42C are shown). Wings 43 and 44 ride on the opposed ramps as the actuator carriage travels toward and away from the magnetic disk.

Magnetic heads 18 and 19 are flexibly mounted on the suspension arms 45 and 46. FIG. 3 is a plan view of suspension arm 45. Wing 43 extends transversely across the arm 45. It is held in place by the wing attachment devices 50 and 51. FIG. 4 is a side view of the wing attachment device 51 and FIG. 4A shows the device in more detail. Wing attachment device 51 is a stainless steel member with a notch which has an interference fit for the rod 43. The bottom of the notch accommodates the diameter of rod 43. However, the notch narrows at the top to securely lock the wing in place after it is pressed into the tapered notch. This constrains the rod 43 in the X, Y and Z axes without using glue or other secondary processes to assure a secure attachment. This prevents the wing from coming out during operation. The wing cannot be removed without great force.

While a particular embodiment of the invention has been shown and described, various modifications are within the true spirit and scope of the invention. The appended claims are, therefore, intended to cover all such modifications.

What is claimed is:

1. In an actuator for carrying a read/write head into engagement with a recording medium comprising:

a carriage assembly for carrying said head into engagement with said recording medium;

means for flexibly mounting said head on said carriage assembly;

a wing mounted in proximity to said head;

a head load/unload device, said wing riding on said head load/unload device to position said head on said recording medium and to unload said head from said recording medium when said carriage moves away from said recording medium, the improvement comprising:

said wing being a cylindrical rod which extends transversely across said carriage; and two wing attachment devices mounted on said carriage assembly in proximity to said head, one on each side of said head, each attachment device having a tapered notch with an interference fit which secures said rod to said head attachment device.

2. The device recited in claim 1 wherein said notch has an opening facing upwardly, the bottom part of said notch being wide enough to accommodate the diameter of said rod, said attachment device having an upper portion which forms an opening for said notch which is less than the diameter of said rod to lock said rod down after it has been pressed into said notch.

3. The device recited in claim 1 wherein said wing attachment device is mounted on the flexible suspension arm of a Winchester head assembly.

4. The device recited in claim 1 wherein said wing attachment device is of stainless steel.

5. The device recited in claim 1 wherein said wing attachment device locks said wing in three axes of constraint to secure attachment.

* * * * *